(12) United States Patent
Locker et al.

(10) Patent No.: US 7,836,442 B2
(45) Date of Patent: Nov. 16, 2010

(54) OUT-OF-BAND PATCH MANAGEMENT SYSTEM

(75) Inventors: Howard J. Locker, Cary, NC (US); Richard Wayne Cheston, Morrisville, NC (US); Daryl C. Cromer, Cary, NC (US); Randall Scott Springfield, Chapel Hill, NC (US); Hans Goran Ingemar Wibran, Cary, NC (US)

(73) Assignee: Lenovo (Singapore) PTE. Ltd., Tech Park (SG)

( * ) Notice: Subject to any disclaimer, the term of this patent is extended or adjusted under 35 U.S.C. 154(b) by 915 days.

(21) Appl. No.: 11/686,832

(22) Filed: Mar. 15, 2007

(65) Prior Publication Data

US 2008/0229301 A1 Sep. 18, 2008

(51) Int. Cl.
*G06F 9/44* (2006.01)
(52) U.S. Cl. .................................. 717/169; 717/170
(58) Field of Classification Search .............. 717/169, 717/170
See application file for complete search history.

(56) References Cited

U.S. PATENT DOCUMENTS

| | | | | |
|---|---|---|---|---|
| 5,313,631 | A * | 5/1994 | Kao | 1/1 |
| 6,378,027 | B1 * | 4/2002 | Bealkowski et al. | 710/302 |
| 6,715,100 | B1 * | 3/2004 | Hwang | 714/5 |
| 6,725,317 | B1 * | 4/2004 | Bouchier et al. | 710/312 |
| 7,000,229 | B2 * | 2/2006 | Gere | 717/169 |
| 7,305,577 | B2 * | 12/2007 | Zhang | 714/6 |
| 7,634,601 | B1 * | 12/2009 | Budd et al. | 710/74 |
| 2005/0172280 | A1 * | 8/2005 | Ziegler et al. | 717/168 |
| 2006/0041777 | A1 * | 2/2006 | Fujibayashi | 714/2 |
| 2006/0150014 | A1 * | 7/2006 | Chadalavada | 714/18 |
| 2007/0094654 | A1 * | 4/2007 | Costea | 717/168 |
| 2007/0174686 | A1 * | 7/2007 | Douglas et al. | 714/13 |

* cited by examiner

*Primary Examiner*—Wei Y Zhen
*Assistant Examiner*—Chih-Ching Chow
(74) *Attorney, Agent, or Firm*—Kunzler Needham Massey & Thorpe

(57) ABSTRACT

A computer system is disclosed that includes a primary processor and a service processor operable regardless of a power state of the computer system. A non-volatile memory device is communicatively coupled to the primary processor and the service processor. The non-volatile memory device stores firmware which includes a first list of patches required for installation on the computer system and a second list of patches previously installed on the computer system. A comparator module is provided to determine whether there are patches included in the first list that are not included in second list. A boot module is provided to boot a maintenance operating system in the event the first list includes patches not included in the second list. The maintenance operating system is configured to install, on the computer system, patches included in the first list but not the second list.

14 Claims, 3 Drawing Sheets

OUT-OF-BAND PATCH MANAGEMENT SYSTEM

BACKGROUND OF THE INVENTION

1. Field of the Invention

This invention relates to installing patches on computer systems and more particularly to systems and methods for reliably installing patches on computer systems in a network.

2. Description of the Related Art

The number of security holes, software bugs, and other vulnerabilities that effect or threaten computer systems in networks of various types has increased exponentially over the last decade. For example, statistics gathered from CERT (Computer Emergency Response Team) indicate that vulnerabilities have risen from 171 in 1995 to 5990 in 2005, a growth of 3500 percent in just ten years. This figure may actually be higher, since these numbers do not include vulnerabilities that may be present in custom software. The effects of these vulnerabilities are manifold and may include, for example, computer and network downtime, remediation time and costs, impaired data integrity, loss of credibility, loss of revenue, negative public relations, exposure to legal action, and loss of intellectual property.

Many computer and network vulnerabilities may be resolved by implementing countermeasures on effected systems, such as by installing a "patch" or other critical update. Nevertheless, although a patch may remedy a particular vulnerability, a patch must be installed on the effected system prior to an attack to be effective. Unfortunately, there is usually a significant delay from the time a patch is released to the time it is actually applied to a system. It is during this interval that the majority of the most damaging attacks occur. Consequently, a vast amount of damage and disruption could be avoided by simply ensuring that patches are installed in a timely manner when made available.

For this reason, one of the most important responsibilities of IT specialists is that of regularly patching and updating computer software on a network. Such a task generally requires a pro-active management approach as opposed to a "wait-and-see" approach to be effective. This task is becoming more difficult, however, as the number of vulnerabilities and applications run by an enterprise continues to increase. Adding to the difficulty is the need to apply patches to running and non-running systems while maintaining operational efficiency and without causing interruptions or breakdowns in the system.

The ability to effectively manage patches may also require accurate up-to-date knowledge of hardware and software assets of a network. Absent this information, it may be impossible or at least highly inefficient to determine which computers in a network or other environment require an update. Acquiring this information may be difficult where certain computers are turned off or where selected computer systems are down for repair or service.

Currently, there is no reliable and efficient way to ensure that patches are successfully applied to computers in a large network, such as a corporate network. This is especially true where patches are administered remotely. For example, there is no reliable and efficient way to ensure that computers on the network have been rebooted where patch installation requires a reboot. There is also no reliable and efficient way to ensure that patches are installed on computers that are turned off or non-operational.

SUMMARY OF THE INVENTION

In view of the foregoing, what are needed are apparatus, systems, and methods to ensure that patches are efficiently and reliably applied to computer systems in networks such as corporate networks. Ideally, such apparatus, systems, and methods would enable an IT specialist to remotely monitor and administer patches. Such apparatus, systems, and methods would also ideally ensure that computers on the network have been rebooted where patch installation requires a reboot, and that patches are eventually installed on computers that are turned off or non-operational.

The present invention has been developed in response to the present state of the art, and in particular, in response to the problems and needs in the art that have not yet been fully solved by currently available systems and methods. Accordingly, the present invention has been developed to provide apparatus, systems, and methods for managing patches on computer systems connected to a network.

In a first aspect of the invention, one embodiment of a computer system in accordance with the invention includes a primary processor and a service processor operable regardless of a power state of the computer system. A non-volatile memory device is communicatively coupled to the primary processor and the service processor. The non-volatile memory device stores firmware which includes a first list of patches required for installation on the computer system and a second list of patches previously installed on the computer system. A comparator module is provided to determine whether there are patches included in the first list that are not included in the second list. A boot module is provided to boot a maintenance operating system in the event the first list includes patches not included in the second list. This maintenance operating system is configured to install, on the computer system, patches included in the first list but not the second list.

In another aspect of the invention, one embodiment of a system in accordance with the invention includes a server and a computer system in communication with the server. The computer system includes a primary processor and a service processor operable regardless of a power state of the computer system. A non-volatile memory device storing firmware is communicatively coupled to the primary processor and the service processor. The firmware stores a first list of patches, communicated from the server to the computer system, required for installation on the computer system, and a second list of patches previously installed on the computer system. A comparator module is used to determine whether there are patches included in the first list that are not included in the second list. In the event the first list includes patches not included in the second list, a boot module is provided to boot a maintenance operating system configured to install, on the computer system, patches included in the first list but not the second list.

In another aspect of the invention, one embodiment of a method in accordance with the invention includes retrieving a first list of patches required for installation on a computer system. A second list of patches previously installed on the computer system is retrieved from firmware. The first list is then compared to the second list to determine whether there are patches included in the first list that are not included in the second list. In the event there are patches included in the first list that are not included in the second list, the method includes installing the additional patches on the computer system.

In another aspect of the invention, a computer-readable medium storing a program of machine-readable instructions executable by a digital processing apparatus is disclosed. In selected embodiments, the machine-readable instructions include an operation to retrieve a first list of patches required for installation on a computer system. Another operation retrieves, from firmware, a second list of patches previously installed on the computer system. Another operation compares the first list to the second list to determine whether there are patches included in the first list that are not in the second list. Finally, an operation installs, on the computer system, patches included in the first list but not the second list.

The present invention provides novel apparatus, systems, and methods for managing patches on computer systems in a network. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Figure 1:
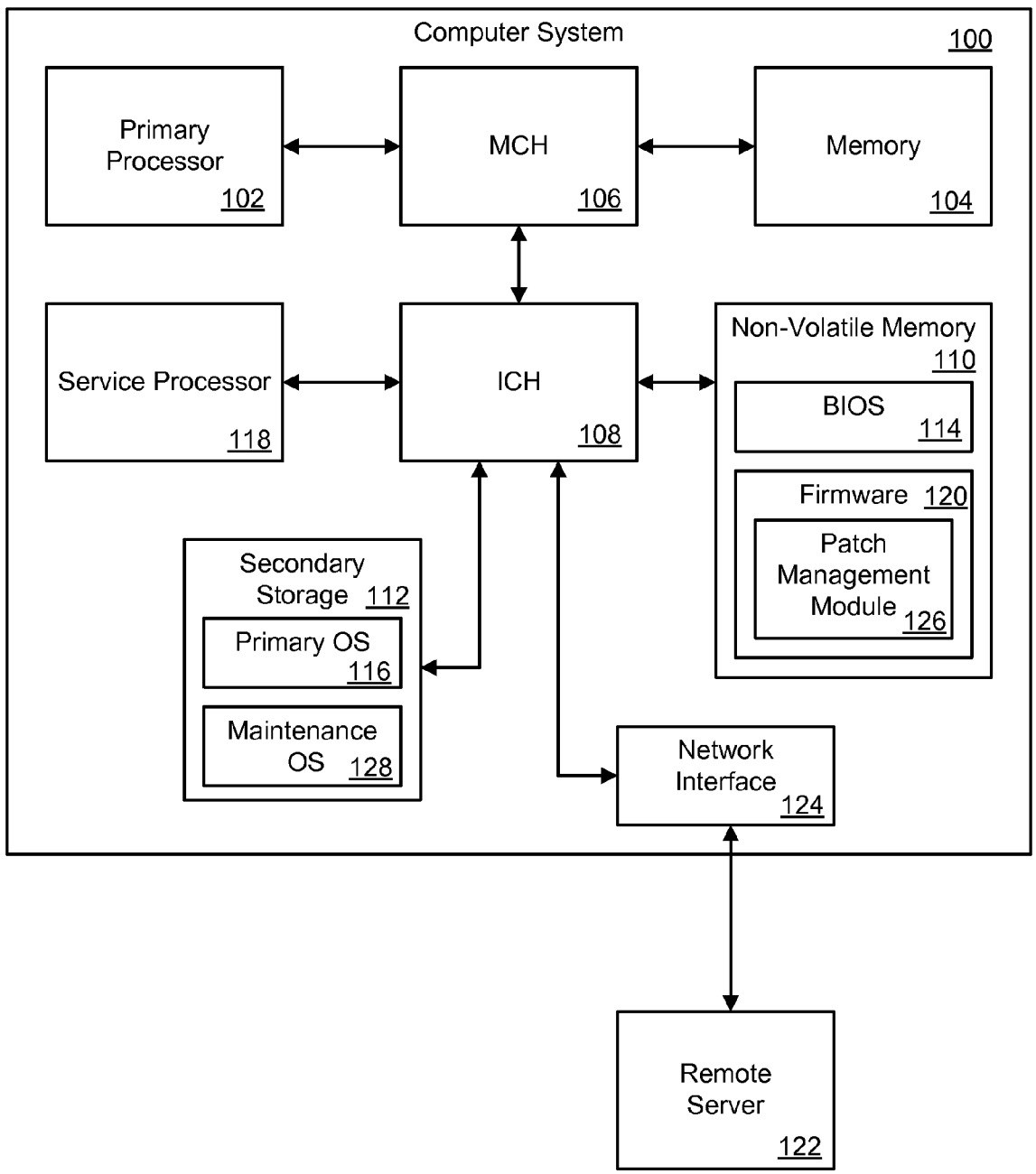
FIG. 1 is a high-level schematic block diagram of one embodiment of a computer system implementing a patch management system in accordance with the invention.

It will be readily understood that the components of the present invention, as generally described and illustrated in the Figures herein, may be arranged and designed in a wide variety of different configurations. Thus, the following more detailed description of the embodiments of the apparatus and methods of the present invention, as represented in the Figures, is not intended to limit the scope of the invention, as claimed, but is merely representative of selected embodiments of the invention.

One or more of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, specific details are provided, such as examples of programming, software modules, user selections, etc., to provide a thorough understanding of embodiments of the invention. One skilled in the relevant art will recognize, however, that the invention may be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

For the purposes of this disclosure, the term "patch" is used broadly to include all types of hardware and software fixes, updates, security patches, service packs, or the like.

Referring to FIG. 1, in certain embodiments, a computer system 100 for use with a patch management system in accordance with the invention may include a primary processor 102, memory 104, and a chipset 106, 108, which may include, for example, a memory controller hub 106 and an I/O controller hub 108. In selected embodiments, the I/O controller hub 108 may interface with a non-volatile memory device 110, such as a flash memory device, PROM, EPROM, EEPROM, or the like, and a secondary storage device 112, such as a hard drive. The non-volatile memory device 110 may store firmware, such as a BIOS 114, to execute when the computer system 100 is first powered on and to prepare hardware on the computer system 100 to initialize and eventually pass control to a primary operating system 116, such as one of the Windows®, Linux®, or Macintosh® operating systems. The primary operating system 116 may reside, for example, in a secondary storage device 112 before being loaded into memory 104 and executed by the primary processor 102.

In selected embodiments, the computer system 100 may also include a service processor 118 which is independent from the primary processor 102 and capable of operating regardless of the power state or operational state of the primary processor 102, memory 104, or hard drive 112. The service processor 118 may remain operational, for example, even when the computer system 100 is turned off, as long as the service processor 118 has access to standby or auxiliary power from the computer's power supply, a battery, or the like.

The service processor 118 may be implemented in any suitable location within the computer system 100. For example, the service processor 118 may be implemented as a discrete component mounted to a motherboard or be integrated into the memory controller hub 106, the I/O controller hub 108, or the like. If the service processor 118 is a discrete component, the service processor 118 may be configured to interface with the memory controller hub 106, the I/O controller hub 108 (as illustrated), or the like.

The service processor 118 may be configured to execute firmware 120 stored in a non-volatile memory device 110, such as that used to store the BIOS 114. This firmware 120 may provide functionality to the service processor 118 and may be used to provide various different functions depending on how it is programmed. For example, the firmware 120 may include code, executable on the service processor 118, to enable remote monitoring and management of the computer system 100 by a remote server 122 or computer system 122. The firmware 120 may also include information about the computer system 100 discoverable by a remote server 122. This may enable a remote server 122 to discover computing assets even when the computer 100 is powered down or non-operational. In other embodiments, the firmware 120 may include code enabling the computer system 100 to be remotely repaired or healed, such as after a primary operating system failure. Thus, the firmware 120 may be executed regardless of the power state of the computer system 100 or the operational state of the primary operating system 116. In selected embodiments, the service processor 118 and firmware 120 may be configured to function in accordance with Intel's® Active Management Technology.

There are various advantages to storing code, including executables and operational data, associated with the service processor 118 in non-volatile memory 110. For example, the code may persist in memory 110 even when a primary operating system 116 is re-installed on the computer system 100 and may operate even when no operating system 116 is present at all. The code may also be executed by the service processor 118 when the computer system 100 is powered off or is missing components such as a primary processor 102 or hard drive 112. The code may also be secure and resistant to end-user tampering since the code may be configured such that end-users may lack tools or permissions to intentionally or accidentally alter the code.

The computer system 100 may also include a network interface 124 to communicate with other devices and systems in a network. The network interface 124 may also be configured to operate regardless of the power state of the computer system 100 or operational state of the primary operating system 116. In this way, a remote server 122 or computer 122 may be able to communicate with the service processor 118 and non-volatile memory 110 even when the computer 100 is powered down or broken, or the operating system is non-operational. In certain embodiments, executable code for the network interface 124 may also be stored in the non-volatile memory 110 to enable it to remain operational regardless of the operational state of the rest of the system 100. In certain embodiments, the network interface 124 may be configured to identify out-of-band network traffic (i.e., traffic directed to the service processor 118 as opposed to the primary processor 102) and route it to the service processor 118 instead of the primary processor 102.

In certain embodiments, the firmware 120 may be configured to include a patch management module 126 in accordance with the invention. The patch management module 126 may be configured to ensure that new or updated patches are installed on the computer system 100 before the next boot of the primary operating system 116. The patch management module 126 may remain operational regardless of the operating state of the computer system 100. As will be explained in more detail hereafter, the patch management module 126 may, in certain embodiments, be configured to initiate a maintenance operating system 128 to download and install patches on the computer system 100.

Figure 2:
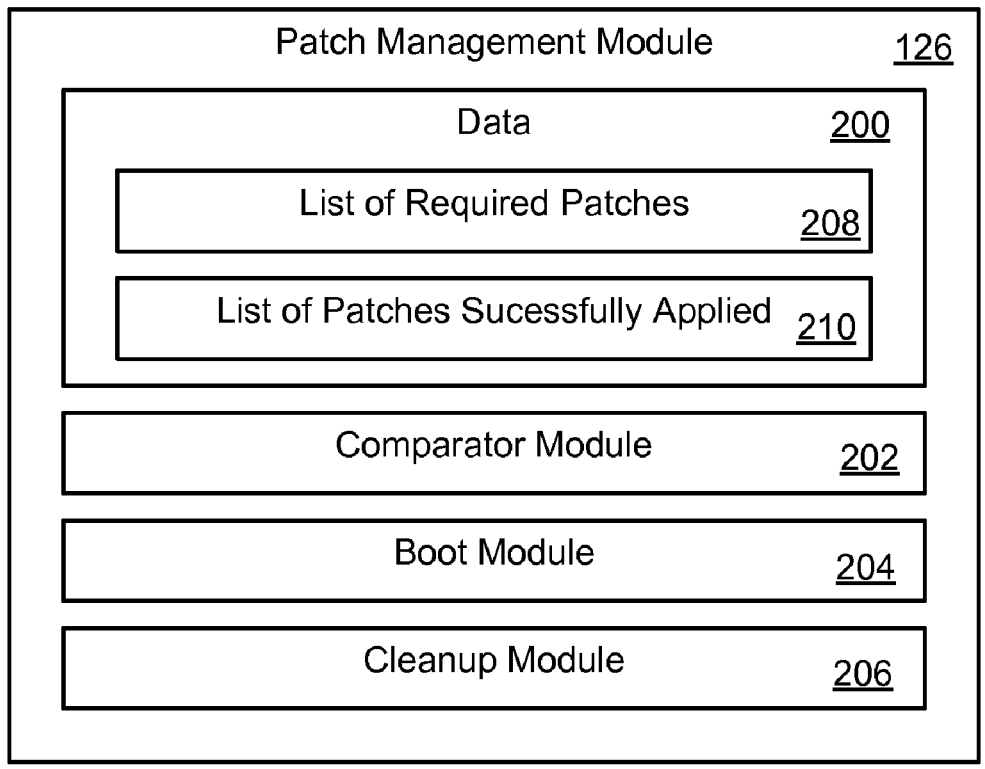
FIG. 2 is a high-level schematic block diagram of one embodiment of a patch management module in accordance with the invention.

Referring to FIG. 2, in certain embodiments, a patch management module 126 in accordance with the invention may include operational data 200 as well as one or more executable modules 202, 204, 206. For example, in selected embodiments, the patch management module 126 may store one or more lists 208, 210. A first list 208 may identify patches that need to be installed on the computer system 100. In certain embodiments, the first list 208 may be updated by a remote server 122, which may communicate directly with the computer system 100 or broadcast (e.g., once an hour) the list 208 to computer systems 100 in a network. Because the first list 208 may be written to non-volatile memory 100 by way of the service processor 118, this list 208 may be updated regardless of the power or operational state of the computer system 100 or operating system 116, ensuring that updates are applied to the system 100. A second list 210 may identify patches that have been previously and successfully applied to the computer system 100. In selected embodiments, a server 122 may query either list 208, 210 at any time to identify what patches have been installed or are scheduled to be installed.

In selected embodiments, the patch management module 126 may include a comparator module 202. The comparator module 202 may be configured to compare the first list 208 to the second list 210 to determine if there are patches included in the first list 208 that are not in the second list 210. If there are patches in the first list that are not in the second list, the patch management module 126 may initiate a process for installing the additional patches. For example, in certain embodiments, a boot module 204 may be provided to initiate a maintenance operating system 128, as will be explained in more detail in association with FIG. 3, for installing the additional patches. Conversely, if the comparator module 202 determines that the first list is equal to the second list, the boot module 204 may be configured to boot up a primary operating system 116.

In certain embodiments, the patch management module 126 may also include a cleanup module 206 to maintain and remove entries from the lists 208, 210 once patches have been installed successfully. For example, as opposed to letting the lists 208 grow indefinitely (which may eventually consume undesirable amounts of non-volatile memory 110), the cleanup module 206 may remove patches from the lists 208 once the lists have reached a certain size, contain a selected number of patches, or contain patches that have been on the list a specified amount of time. In certain embodiments, entries (i.e., patches) may be removed from each list 208, 210 using a FIFO approach.

Figure 3:
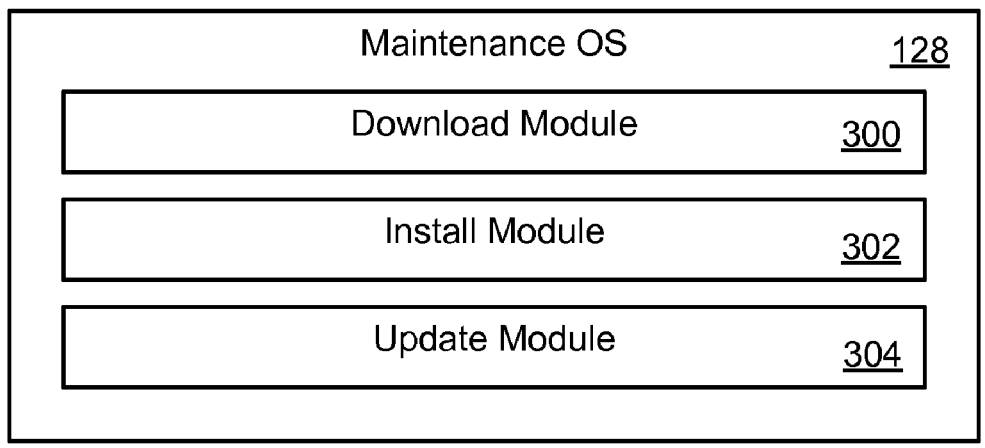
FIG. 3 is a high-level schematic block diagram of one embodiment of various modules that may be included in a maintenance operating system in accordance with the invention.

Referring to FIG. 3, in certain embodiments, a maintenance operating system 128 to install patches on the computer system 100 may include a download module 300, an install module 302, and an update module 304. In certain embodiments, the maintenance operating system 128 may be stored in an alternate boot area of the secondary storage device 112 (e.g., hard drive). Upon booting up the maintenance operating system 128, a download module 300 may connect to a patch server 122 and download patches recorded in the first list 208 but not the second list 210. The patch server 122 may provide a central repository for dispersing patches to numerous computer systems 100 in a network.

Once downloaded, an install module 302 may be used to install the patches on the computer system 100. Because the maintenance operating system 128 may operate independently of the primary operating system 116, patches installed by the install module 302 may be used to repair problems with the operating system 116 or other software without needing to boot the primary operating system 116. This may enable various patches to clean, repair, or delete files that may otherwise be running services when the primary operating system 116 is booted and operating. In certain cases, this may be the preferred method for correcting vulnerabilities, such as security holes, or removing malicious software, such as viruses, from the computer system 100.

After installing required patches on the computer system 100, an update module 304 may be used to update the second list 210 to reflect the newly installed patches. This may prevent the patch management module 126 and maintenance operating system from re-installing patches that have already been installed. The maintenance operating system 128 may then terminate operation either automatically or as directed by user input. In certain embodiments, this may include restarting the computer system 100 and booting the primary operating system 116.

Figure 4:
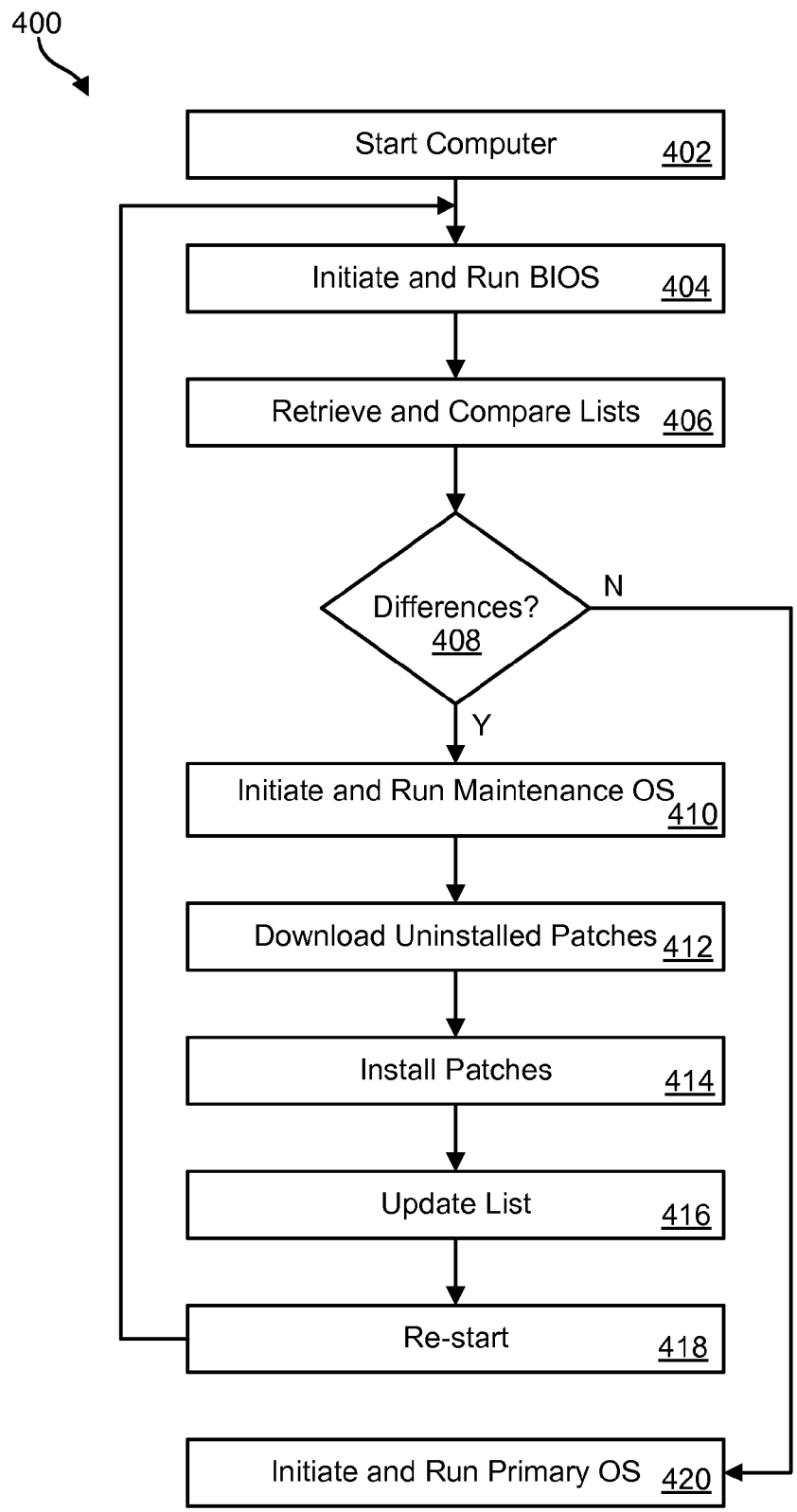
FIG. 4 is a flow diagram illustrating one embodiment of a method in accordance with the invention for updating patches on a computer system.

Referring to FIG. 4, one embodiment of a method 400 for installing patches on a computer system 100 may include initially starting 402 the computer system 100. This may initiate 404 and run 404 the system BIOS. Running the BIOS may include initiating and running the patch management module 126 which may be configured to run concurrently with the BIOS. In selected embodiments, the patch management module 126 is a BIOS extension incorporating the functionality of the patch management module 126 into the BIOS.

The method 400 may then retrieve 406 and compare 406 lists of patches to determine if the computer system 100 requires additional patches. This may include, for example, retrieving 406 the first and second lists 208, 210 previously discussed in association with FIG. 2. As previously mentioned, both the first and second lists 208, 210 may be stored in non-volatile memory 110 of the computer system 100. In alternative embodiments, however, it is also contemplated that one or more of the lists may be retrieved from an alternate location. For example, a first list 210 of required patches may be retrieved from a server 122 and a second list 210 of applied patches may be retrieved from the firmware of the computer system 100.

Once retrieved, the lists 208, 210 may be compared, at a decision step 408, to determine whether the first list 208 includes patches not recorded in the second list 210. If the second list 210 does not include all of the patches defined in the first list 208, the additional patches may be installed on the computer system 100. In certain embodiments, this may include initiating 410 and running 410 a maintenance operating system. To perform the installation, the maintenance operating system may be configured to download 412 the additional patches, install 414 the patches on the computer system 100, and update 416 the second list to reflect the newly installed patches. Once completed, the maintenance operating system may re-start 418 the computer system 100. This may reinitiate 404 the BIOS and the comparison step 406. However, because the patches have been updated, the lists 208, 210 will likely be equal (unless a new patch has been added in the interim). Thus, at the decision step 408, the method 400 may initiate a normal boot sequence such as by initiating 420 and running 420 a primary operating system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
    a primary processor;
    a service processor operable regardless of a power state of the computer system powered from an auxiliary power;
    a non-volatile memory device communicatively coupled to the primary processor and the service processor, the non-volatile memory device storing:
        a first list of patches required for installation on the computer system;
        a second list of patches previously installed on the computer system;
    the non-volatile memory further storing the firmware executed by the service processor when the computer system is powered on and before loading a primary operating system, the firmware comprising:
        a comparator module to determine whether patches are included in the first list that are not included in the second list; and
        a boot module to boot a maintenance operating system in the event the first list includes patches not included in the second list, the maintenance operating system configured to install, on the computer system, patches included in the first list but not the second list, the boot module further initiating the primary operating system in the event all patches included in the first list are included in the second list.

2. The computer system of claim 1, further comprising a secondary storage device storing the maintenance operating system.

3. The computer system of claim 1, further comprising a network interface enabling communication between the computer system and a server regardless of the power state of the computer system.

4. The computer system of claim 3, wherein the first list is modifiable by a server regardless of a power state of the computer system.

5. The computer system of claim 1, wherein the maintenance operating system is further configured to download, from a server, patches included in the first list but not the second list.

6. The computer system of claim 1, wherein the maintenance operating system is further configured to update the second list to reflect patches successfully installed on the computer system by the maintenance operating system.

7. The computer system of claim 1, wherein the maintenance operating system is further configured to reboot the computer system after installing patches included in the first list but not the second list.

8. A system comprising:
    a server;
    a computer system in communication with the server and comprising:
        a primary processor;

a service processor operable regardless of a power state of the computer system powered from an auxiliary power;

a non-volatile memory device communicatively coupled to the primary processor and the service processor, the non-volatile memory device storing:

a first list of patches, communicated from the server to the computer system, required for installation on the computer system;

a second list of patches previously installed on the computer system;

the non-volatile memory further storing the firmware executed by the service processor when the computer system is powered on and before loading a primary operating system, the firmware comprising:

a comparator module to determine whether patches are included in the first list that are not included in the second list; and a boot module to boot a maintenance operating system in the event the first list includes patches not included in the second list, the maintenance operating system configured to install, on the computer system, patches included in the first list but not the second list, the boot module further initiating the primary operating system in the event all patches included in the first list are included in the second list.

9. The system of claim 8, wherein the first list is modifiable by the server regardless of a power state of the computer system.

10. The system of claim 8, wherein the maintenance operating system is further configured to download, from the server, patches included in the first list but not the second list.

11. The system of claim 8, wherein the maintenance operating system is further configured to update the second list to reflect patches successfully installed on the computer system by the maintenance operating system.

12. A method to install patches comprising:

retrieving, by use of a service processor executing firmware when a computer system is powered on and before loading a primary operating system, the service processor operable regardless of a power state of the computer system, and powered from an auxiliary power, a first list of patches required for installation on the computer system from a non-volatile memory, wherein the non-volatile memory stores the firmware;

retrieving, from the non-volatile memory, a second list of patches previously installed on the computer system;

comparing the first list to the second list to determine whether patches are included in the first list that are not included in the second list;

installing on the computer system patches included in the first list but not the second list in the event the first list includes patches not included in the second list; and initiating the primary operating system in the event all patches included in the first list are included in the second list.

13. The method of claim 12, further comprising updating the second list to reflect patches successfully installed on the computer system.

14. A computer-readable storage medium storing a program of machine-readable instructions executed by a digital processing apparatus to perform operations to install patches on a computer system, the operations comprising:

retrieving, by use of a service processor executing firmware when a computer system is powered on and before loading a primary operating system, the service processor operable regardless of a power state of the computer system, and powered from an auxiliary power supply, a first list of patches required for installation on the computer system from a non-volatile memory, wherein the non-volatile memory stores the firmware;

retrieving, from the non-volatile memory, a second list of patches previously installed on the computer system;

comparing the first list to the second list to determine whether patches are included in the first list that are not included in the second list;

installing, on the computer system, patches included in the first list but not the second list in the event the first list includes patches not included in the second list; and initiating the primary operating system in the event all patches included in the first list are included in the second list.

* * * * *